United States Patent [19]

Minott

[11] 4,350,410

[45] Sep. 21, 1982

[54] MULTIPRISM COLLIMATOR

[75] Inventor: Peter O. Minott, Bowie, Md.

[73] Assignee: The United States of America as represented by the Administrator of the National Aeronautics and Space Administration, Washington, D.C.

[21] Appl. No.: 195,228

[22] Filed: Oct. 8, 1980

[51] Int. Cl.³ ............................ G02B 27/12; G02B 5/04
[52] U.S. Cl. ..................................... 350/170; 350/286
[58] Field of Search ................. 350/170, 286, 287, 169

[56] References Cited

U.S. PATENT DOCUMENTS

| | | | |
|---|---|---|---|
| 3,670,260 | 6/1972 | Koester et al. | 350/286 |
| 3,758,197 | 9/1973 | Klang et al. | 350/286 |
| 3,862,357 | 1/1975 | Kanazawa et al. | 350/162 SF |
| 4,070,574 | 1/1978 | Fletcher et al. | 250/213 |
| 4,125,864 | 11/1978 | Aughton | 350/286 |
| 4,294,546 | 10/1981 | Killmann et al. | 350/286 |

Primary Examiner—Jon W. Henry
Attorney, Agent, or Firm—John O. Tresansky; John R. Manning; Ronald F. Sandler

[57] ABSTRACT

A special purpose optical collimator system which generates multiple collimated light beams, with precisely related angular separation of the beams. The system is comprised of a stack of relatively flat plate-like refracted prisms ($10_1, 10_2 \ldots 10_{15}$) in the form of wedges, each having a specified angular deviation, mounted on top of one another in a fixture (44) which holds the wedges so that they are adapted to operate at minimum angular deviation and thus are relatively insensitive to rotational and angular charges. A collimated source of monochromatic light generated for example by a helium-neon laser (20) and a collimated beam expander (24, 30 and 54) provides a common incident beam (14) to the wedges whereupon a plurality of, for example, equally spaced emergent beams ($12_1, 12_2 \ldots 12_{15}$) are provided.

14 Claims, 7 Drawing Figures

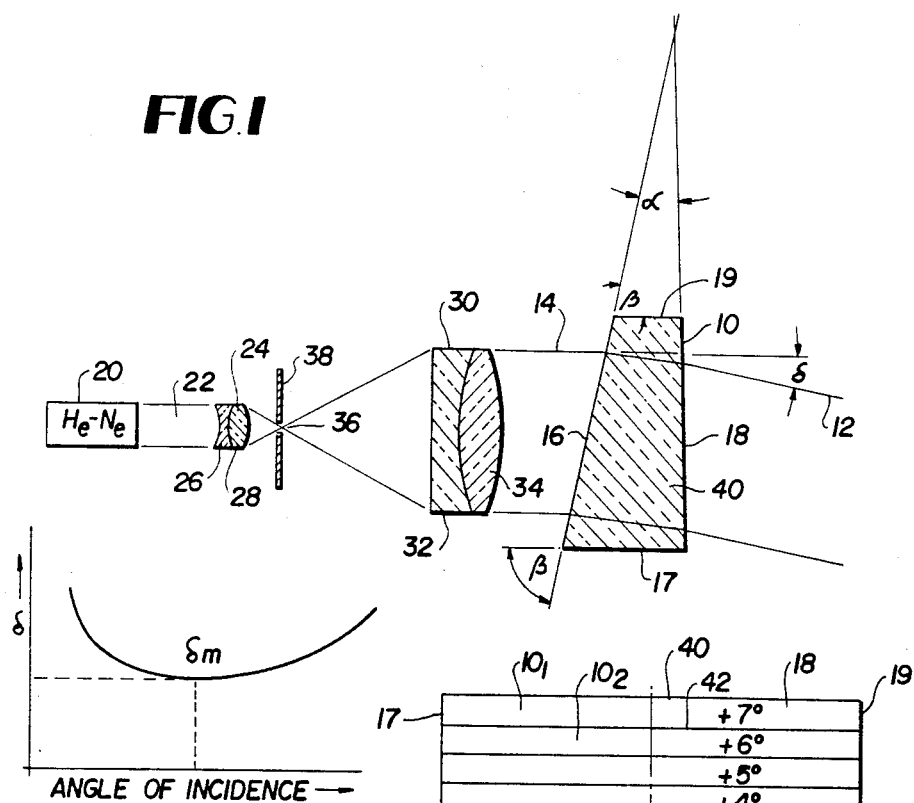
FIG.1
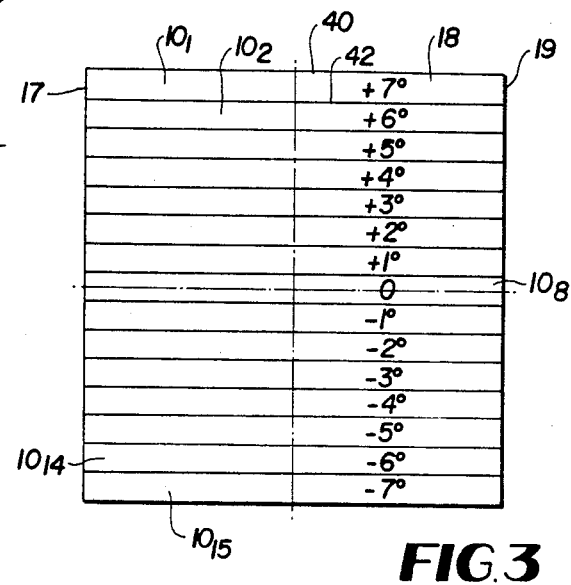
FIG.2
FIG.3
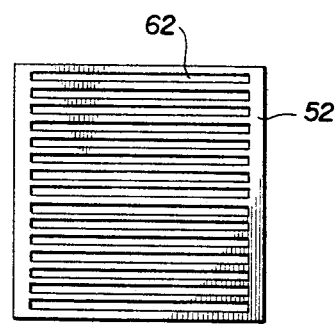
FIG.7

MULTIPRISM COLLIMATOR

Origin of the Invention

The invention described herein was made by an employee of the United States Government and may be manufactured and used by or for the Government for governmental purposes without the payment of any royalties thereon or therefor.

MULTIPRISM COLLIMATOR

1. Technical Field

The invention relates generally to optical apparatus and more particularly to a multibeam collimated light source.

2. Background Art

The invention has particular utility in providing a measurement of angular separation in that there is provided a plurality of collimated light beams having precisely related angular separation therebetween and as such is adapted for application where precise angular alignment of components is required.

In the past various jigs and fixtures involving multiple mirrors on adjustable mechanical mounts have been used to generate multiple beams of collimated light for alignment purposes, such as machine elements, land surveys and the like. Theodolites, transits and the like have also been used for alignment purposes. Also, optical polygons have been used to provide an angular reference where precise alignment is needed.

The inherent disadvantage of prior art apparatus is that they are generally sensitive to drift from mechanical vibration, changing gravitational load and external thermal gradients. Moreover, theodolites and transits have a limitation insofar as the precision of the angular measurement that can be made. Also such apparatus can measure but one angle at a time. Measuring an angle with a theodolite additionally requires two readings of the azimuth dial and there are many sources of error in the theodolite such as bearing run out, dial reading parallax, and thermal disalignment of the instrument which makes measurements of relatively high precision impossible.

STATEMENT OF THE INVENTION

Accordingly, it is an object of the present invention to provide an improvement in apparatus which generates multiple collimated light beams.

Another object of the present invention is to provide apparatus for generating collimated light beams which are relatively insensitive to vibration and temperature changes.

Still another object of the present invention is to provide apparatus for generating a plurality of collimated light beams which can be utilized for alignment purposes.

These and other objects are achieved by an optical multibeam collimator comprised of a plurality of stacked optical refractive prisms each having a predetermined different angular deviation between incident and emergent rays and positioned relative to a source of incident rays to provide substantially minimum deviation in response to any rotation or translation of said prisms. In its preferred embodiment, the collimator is comprised of a stack of flat plate wedge type prisms mounted in a box type frame and whose side edges are utilized as the input and output pupils having light applied from a source of monochromatic light. The angular relationship of opposing edges define the refractive deviation for light passing through each of the plates and accordingly the prisms are arranged so that these angles are varied in predetermined increments so as to provide a set of output beams which have a precisely related mutual angular separation therebetween.

The foregoing as well as other objects, features and advantages of the present invention will become more apparent from the following detailed description taken in conjunction with the following drawings.

BRIEF DESCRIPTION OF THE DRAWINGS

FIG. 1 is a diagram illustrative of the inventive concept embodied by the subject invention;

FIG. 2 is a graph generally illustrative of the principle of minimum deviation;

FIG. 3 is a diagram illustrative of a stack of refractive optical wedges in accordance with the subject invention wherein each wedge provides a respective different angular deviation of its emergent optical beam;

FIG. 7 is a front plan view of a mask which is adapted to be used in conjunction with the assembly shown in FIGS. 4 and 5.

DETAILED DESCRIPTION OF THE INVENTION

Figure 5:
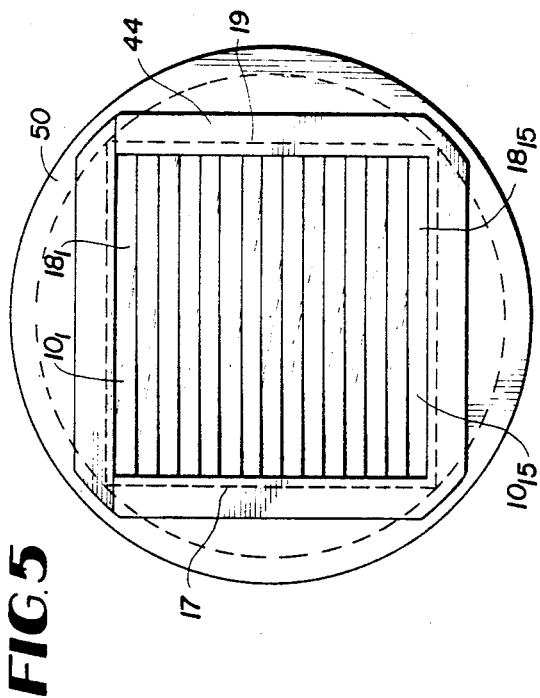
FIG. 5 is a front plan view of the assembly shown in FIG. 4.

Referring now to the drawings and more particularly to FIG. 1, reference numeral 10 denotes one of a plurality of refractive wedge type prisms which is adapted to provide an emergent optical beam 12 having a predetermined angular deviation $\delta$ relative to an incident beam 14. The angle of deviation $\delta$ is a function of the index of refraction n of the material from which the prism is fabricated and the angle $\alpha$ formed between the input and output pupils defined by the faces 16 and 18. This relationship can be expressed mathematically by the approximation:

$$\delta \approx (n-1)\alpha$$

The incident beam 14 consists of a collimated beam of monochromatic light formed by means of a monochromatic source 20, preferably but not exclusively consisting of a TEM$_{00}$ mode helium-neon laser, which produces a relatively high intensity diffraction limited plane wave beam 22 at 6328 Å which can be precisely collimated by collimator 26–34. The relatively high intensity laser beam 22 is next expanded and collimated in a well known manner to form a plane wavefront by being directed to a focusing objective 24 consisting of a compound lens combination 26 and 28 which expands and focuses the beam at the focus of a collimator objective 30 also shown consisting of a compound lens combination 32 and 34. At the focus of the collimator objective 30 is a spatial filter element 38 consisting of a pinhole. Although not absolutely necessary, the spatial filter 38 is desirable and is helpful in providing a diffraction limited plane wavefront which constitutes the incident beam 14 shown in FIG. 1.

In addition to the above considerations, the invention also contemplates making use of the principle of minimum deviation. This principle is well known and is described, for example, in a publication entitled, "Fundamentals of Optics", Jenkins and White, 3rd Edition, McGraw-Hill, 1957 at pages 21 and 22. As explained therein, if a prism is rotated continuously in one direction about an axis parallel to a refracting edge, the angle of deviation will decrease, reach a minimum and then increase as shown in FIG. 2. The smallest of these deviation angles is called the angle of minimum deviation $\delta_m$ and occurs at a particular angle of incidence where the refracted ray inside the prism makes equal angles with the two prism faces.

In the present invention, the angle of minimum deviation is achieved by orienting the wedge 10 relative to the incident beam 14 so that the input face 16 provides the incident angle necessary for the beam to provide minimum deviation. This orientation is effected by providing a pair of parallel side faces 17 and 19 which define an angle $\beta$ with the input face 16. This angle is adapted to provide minimum deviation when the side faces 17 and 19 are parallel to the incident beam 14. Under these conditions, a certain degree of rotation of the prism 10 relative to the incident beam 14 can be tolerated due to the deviation angle characteristic shown in FIG. 2 which indicates that in the region on either side of the point of minimum deviation, $\delta_m$, relatively little change occurs for changes in the angle of incidence.

Consequently, in view of the foregoing, the preferred embodiment of the subject invention contemplates the use of a plurality of refractive wedge type prisms $10_1$, $10_2$ ... $10_{14}$ and $10_{15}$ which are adapted to be mounted in a stacked configuration as illustrated in FIG. 3 in a fixture, not shown. Each of the prisms are comprised of flat plates having upper and lower surfaces 40 and 42 which are relatively large in comparison to the side surfaces 16, 17, 18 and 19 wherein surfaces 16 and 18 constitute the input and output pupils, respectively. The parallel side faces 17 and 19 are the mounting surfaces as will be shown. Moreover, each of the wedges $10_1$ ... $10_{15}$ is adapted to provide a different deviation angle which vary in angle and may have any value. As an example, one degree increments are shown in FIG. 3 ranging between $+7°$ and $-7°$ with the centermost wedge $10_8$ providing a 0° deviation. There is no particular significance to the one degree increments; it is a matter of convenience for the application shown.

Figure 4:
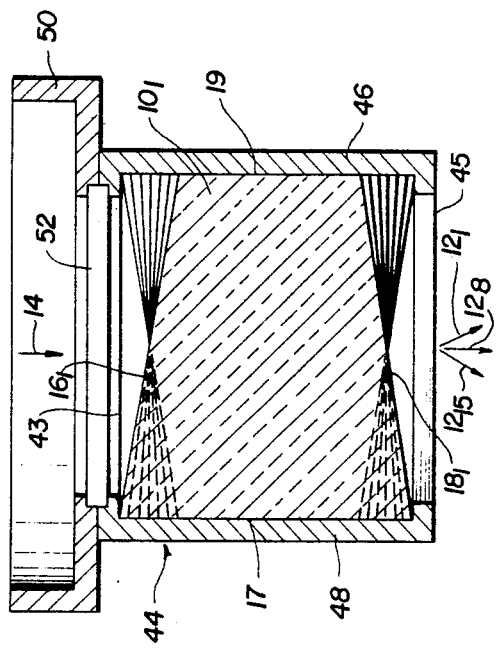
FIG. 4 is a top plan view of a multiprism assembly according to the subject invention.

Referring now to FIG. 4, a stack of wedge type prisms shown in FIG. 3 is adapted to be placed in a box-like housing 44 having opposing open front and back walls 43 and 45 and a pair of side walls 46 and 48, the latter adapted to accommodate the respective parallel side faces 17 and 19 of the wedge prism $10_1$ ... $10_{15}$. An incident beam 14 is projected through the front wall 43 to the input faces 16 of prism assembly. FIG. 4 illustrates in its top planar view the angular variation of the input and output faces 16 and 18 due to the fact that side edges 17 and 19 have a constrained parallel alignment. The configuration shown in FIG. 3 contemplates 1° increments between the individual output beams $12_1$ ... $12_{15}$; however, an important feature of the housing structure shown in FIG. 3 is that the individual prisms $10_1$ ... $10_{15}$ can be taken out and replaced at will, with no care taken to realign the prisms, inasmuch as the minimum deviation angle feature is built into the system by virtue of the angular relationship of the face 16 with the faces 17 and 19, i.e. angle $\beta$ shown in FIG. 1. Additionally, any desired angular output combination of the individual beams can be obtained simply by substituting wedges of different deviations.

Figure 6:
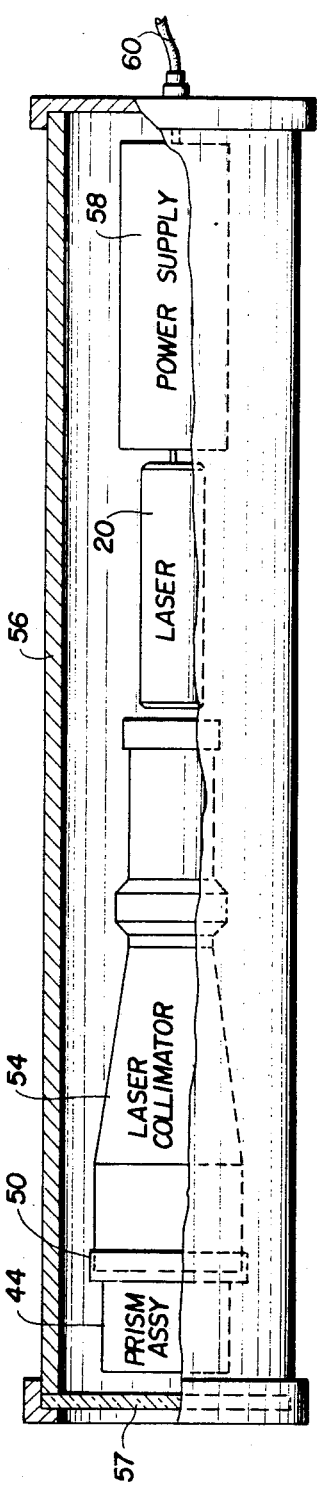
FIG. 6 is a side planar view partially in section of a system including an embodiment of the subject invention adapted for use in a vacuum.

While any box-like frame having an open front and back may be utilized as long as it has a removable top so that the wedges can be dropped in from the top in order, the housing structure 44 shown in FIG. 4 additionally includes a circular mounting rim 50 as well as an element 52 which denotes a mask, the details of which are shown in FIG. 7. From the front, the box-like housing 44 and its circular rim 50 appears as shown in FIG. 5. This structure is utilized in the embodiment shown in FIG. 6 wherein a laser collimator device 54 of a particular shape is shown coupled to the mounting ring 50. The collimator 54 operates in the same fashion as the elements 24, 30 and 38 shown in FIG. 1 and provides a collimated laser beam to the stack of wedge prisms $10_1$ ... $10_{15}$ shown in FIGS. 3 and 4. The device 54 is a commercially available item, a typical example being a Tropel Model 280 Series collimator. These elements are shown enclosed in an elongated housing 56, having an output window 57. Such a configuration is adapted to be pressurized and allows the system to be used, for example, in a vacuum environment. Located behind the collimator 54, in axial alignment therewith, is a helium-neon laser 20 which, for example, comprises a Model 80 Series laser marketed by Coherent Radiation which is adapted to provide a stable, low-noise coherent beam at 6238 Å. In order to power the laser system 20 shown in FIG. 6, the housing 56 is also adapted to include therein a laser power supply 58 which is adapted to receive external AC power from an electrical feedthrough and power chord assembly 60.

As noted above with respect to FIG. 4, the assembly also includes a mask 52, the details of which are shown in FIG. 7. The mask 52 accordingly is positioned between the laser collimator 54 and the glass prisms $10_1$ ... $10_{15}$ and provides a slit type of aperture for the respective input pupils of the multiple prisms to provide for beam spreading of the individual beams. Accordingly, the mask 52 includes a plurality of longitudinal slits 62 equal in number to the number of prisms in the stack. Where, for example, each of the prisms has a thickness in the order of 4.7 mm, the width dimension of each slit along the long dimension is in the order of 0.875 mm and provides a spreading in a direction perpendicular to the slit sufficient to make alignment of the system in this direction non-critical.

As noted, each prism typically, but not necessarily, is in the order of 4.7 mm thick. Also, they are in the order of 82.5 mm wide. Accordingly, when placed in a stack of 15 prisms, the net effect is a combination of flat wedge prisms producing a clear aperture 70.7 mm high and slightly greater than 70.7 mm wide. The prisms are preferably made of a glass, with Schott phosphate crown PK 50 being a typical example. Such a material has a temperature coefficient of a refractive index of $0.09 \times 10^{-6}/°$ C. which is adapted to minimize the effects on prism deviation due to changes in the refractive index of the prism as a function of temperature. One other consideration which should be mentioned is the possibility of chromatic abberation in prisms themselves. For a laser system operating at 6328 Å, the chromatic deviation has been found to be considerably less than 1 Å and therefore these effects can be neglected.

Accordingly, what has been shown and described is a multibeam collimator including a laser and collimator which projects a collimated laser beam through a stack of glass wedges producing a fan of plural collimated beams separated by predetermined angular increments. Moreover, the glass wedges are designed to be mounted in a frame such that they are operating at minimum deviation and accordingly are relatively insensitive to rotation and/or translation.

Having thus shown and described what is at present considered to be the preferred embodiment of the subject invention, modifications will readily occur to those skilled in the art. For example, pentaprisms having angles ground to produce shifts of other than 90° could be utilized. Further, if the refractive entrance and exit faces of these prisms are designed to be normal to the incident and emergent beams these prisms would also be insensitive to rotation. Accordingly, almost any other type of constant deviation prism could be used provided the entrance and exit faces do not produce large refractions. Accordingly, all modifications, changes and alterations coming within the spirit and scope of the present invention as defined in the appended claims are herein meant to be included.

I claim:

1. A refractive optical system for producing multiple beams of light having predetermined angular separations comprising:

means (20, 24, 30, 38) for providing a collimated beam of monochromatic light;

a plurality of optically refractive prisms ($10_1 \ldots 10_{15}$) each providing a predetermined substantially constant angular deviation ($\delta$) between an incident (14) and emergent light beam (12), said prisms being arranged to receive as an incident beam said collimated beam and operable to provide a respective emergent output beam, said plurality of output beams ($12_1 \ldots 12_{15}$) produced thereby defining a pattern of beams determined by the relative angular refractive deviation between said prisms; and means (44) for mounting said prisms so that they are oriented with respect to said incident beam to provide substantially minimum angular deviation ($\delta_m$), thereby providing an arrangement which is relatively insensitive to translational and rotational changes.

2. The system as defined by claim 1 wherein said prisms ($10_1 \ldots 10_{15}$) are arranged in a stack in said mounting means (44).

3. The system as defined by claim 2 wherein each prism (10) in said stack has a different angular deviation ($\delta$).

4. The system as defined by claim 1 wherein said prisms ($10_1 \ldots 10_{15}$) are comprised of wedge prisms.

5. The system as defined by claim 4 wherein said wedge prisms ($10_1 \ldots 10_{15}$) are arranged in a stack in said mounting means and are comprised of flat plate type prisms having relatively broad top and bottom faces (40, 42) and relatively thin side faces (16, 17, 18, 19) and wherein said incident beam is directed (14) to one of said side faces (16), said output beam emerges from another of said side faces (18), and said mounting means contacts at least one other side face (17 or 19).

6. The system as defined by claim 5 wherein mounting means (44) includes a pair of parallel side walls (46, 48) and said wedge prisms include a pair of parallel side faces (17, 19) in contact with said pair of parallel side walls, said parallel side faces additionally forming a predetermined angle ($\beta$) with said one side face (16) whereby said minimum angle deviation ($\delta_m$) is provided when said mounting means is directed to said incident beam (14) so that side walls (46, 48) are parallely aligned with said incident beam.

7. The system as defined by claim 6 wherein said wedge prisms ($10_1 \ldots 10_{15}$) provide mutually different and substantially equal angular deviations ($\delta$) to provide a fan beam pattern.

8. The system as defined by claim 1 wherein said plurality of prisms ($10_1 \ldots 10_{15}$) comprise a stack of relatively flat glass wedges mounted in said mounting means (44) so that said wedges are operating at a position of substantially minimum deviation ($\delta_m$).

9. The system as defined by claim 8 wherein said glass wedges ($10_1 \ldots 10_{15}$) are comprised of low temperature coefficient glass to substantially eliminate the effects of temperature on angular deviation ($\delta$).

10. The system as defined by claim 1 and additionally including means (52) interposed between said means (20, 24, 30) providing said collimated light beam and said refractive means ($10_1 \ldots 10_{15}$) to provide a respective input aperture therefor.

11. The system as defined by claim 10 wherein said plurality of prisms comprise a stack of wedge prisms ($10_1 \ldots 10_{15}$) each having a respective elongated face (16) adapted to receive said incident beam (14), and said interposed means (52) comprises a mask having a plurality of apertures (62) in the form of elongated slits positioned in front of said stack of wedge prisms to provide a discrete entrance pupil area for each prism in said stack.

12. The system as defined by claim 1 wherein said means for providing said collimated light beams includes a laser light source (20).

13. The system as defined by claim 12 wherein said means for providing said collimated light beam additionally includes beam expanding collimator apparatus (24, 30) focused on said laser light source.

14. The system as defined by claim 13 wherein said collimator apparatus includes spatial filter means (38).

* * * * *